(12) United States Patent
Frion

(10) Patent No.: US 11,192,638 B2
(45) Date of Patent: Dec. 7, 2021

(54) AIRCRAFT LANDING GEAR ACOUSTIC SHIELDS

(71) Applicant: SAFRAN LANDING SYSTEMS CANADA INC., Ajax (CA)

(72) Inventor: Stéphane Frion, Newcastle, WA (US)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 89 days.

(21) Appl. No.: 16/670,909

(22) Filed: Oct. 31, 2019

(65) Prior Publication Data

US 2021/0129977 A1 May 6, 2021

(51) Int. Cl.
*B64C 23/00* (2006.01)
*B64C 25/16* (2006.01)
*B64C 25/00* (2006.01)

(52) U.S. Cl.
CPC ............ *B64C 23/005* (2013.01); *B64C 25/16* (2013.01); *B64C 2025/003* (2013.01)

(58) Field of Classification Search
CPC . B64C 23/005; B64C 25/16; B64C 2025/003; B64C 21/00; B64C 2230/04; B64C 2230/06; B64C 25/34; B64C 25/10; B64C 25/14; B64C 25/12; B64C 25/60; B64C 25/00; B64C 25/04; B64C 25/02
See application file for complete search history.

(56) References Cited

U.S. PATENT DOCUMENTS

| 8,668,164 B2 | 3/2014 | Seror Goguet |
| 10,046,851 B2 | 8/2018 | Ganis |
| 2003/0102406 A1* | 6/2003 | Chow ................... B64C 25/001 244/100 R |
| 2006/0102775 A1* | 5/2006 | Chow ..................... B64C 25/16 244/1 N |

(Continued)

FOREIGN PATENT DOCUMENTS

| FR | 2 961 478 A1 | 12/2011 |
| WO | 01/04003 A1 | 1/2001 |

OTHER PUBLICATIONS

International Search Report dated Jan. 27, 2021, issued in corresponding International Application No. PCT/US2020/058216, filed on Oct. 30, 2020, 3 pages.

(Continued)

*Primary Examiner* — Assres H Woldemaryam
(74) *Attorney, Agent, or Firm* — Christensen O'Connor Johnson Kindness PLLC

(57) ABSTRACT

Shield assemblies for an aircraft landing gear include an aerodynamic shield, a first support bracket assembly, and a second support bracket assembly. The first support bracket assembly is configured to couple with a structural member of the aircraft landing gear, to support a first end of the aerodynamic shield, and to have a first position that is fixed relative to the structural member in an x-direction, a y-direction, and a z-direction. The first support bracket assembly has a first clamp that is configured to fix the first support bracket assembly relative to the structural member in the (Continued)

x-direction. The second support bracket assembly is configured to support a second end of the aerodynamic shield and to have a second position that is fixed relative to the structural member in the y-direction and the z-direction.

20 Claims, 10 Drawing Sheets

(56) References Cited

U.S. PATENT DOCUMENTS

| | | | |
|---|---|---|---|
| 2009/0176078 A1 | 7/2009 | Seror et al. | |
| 2011/0309193 A1* | 12/2011 | Seror Goguet | ....... B64C 25/001 244/100 R |
| 2017/0361924 A1* | 12/2017 | Himmelmann | ......... B64C 25/02 |

OTHER PUBLICATIONS

Written Opinion of the International Searching Authority dated Jan. 27, 2021, issued in corresponding International Application No. PCT/US2020/058216, filed on Oct. 30, 2020, 6 pages.

* cited by examiner

AIRCRAFT LANDING GEAR ACOUSTIC SHIELDS

BACKGROUND

The two main contributors to aircraft noise are the engines and the airframe (of which the landing gear is a part). Advancements in engine technology over time have reduced engine noise, thereby increasing the relative contribution to overall aircraft noise by the airframe. Further, commercial airline noise certification requirements are expected to become more stringent. This creates a need to reduce noise attributed to landing gear, including aerodynamic noise caused by deployed landing gear. The present disclosure provides shield assemblies that reduce such aerodynamic noise.

U.S. Patent Publication No. 2009/0176078 A1 discloses a device for reducing aerodynamic noise generated by an aircraft undercarriage. The apparatus includes a lightweight element (e.g., high density polyurethane foam) having a smooth shape that fits over a structural element of a landing gear system. The lightweight element is optionally covered with a covering for protection. French Patent Application Publication FR 2961478 A1 discloses another device for reducing aerodynamic noise, including an aerodynamic cover disposed on at least two supports that are fixed on a landing gear structural element.

SUMMARY

The disclosed technology generally relates to acoustic shield assemblies and acoustic shield systems that are configured to reduce aerodynamic noise associated with landing gear.

In an aspect, the present disclosure provides shield assemblies for an aircraft landing gear. The shield assemblies include an aerodynamic shield, a first support bracket assembly, and a second support bracket assembly. The first support bracket assembly is configured to couple with a structural member of the aircraft landing gear and to support a first end of the aerodynamic shield. The first support bracket assembly is configured to have a first position that is fixed relative to the structural member in an x-direction, a y-direction, and a z-direction, wherein the x-direction is substantially parallel to a longitudinal direction of the structural member, the y-direction is normal to the x-direction, and the z-direction is normal to the x-direction and normal to the y-direction. The first support bracket assembly has a first clamp that is configured to fix the first support bracket assembly relative to the structural member in the x-direction. The second support bracket assembly is configured to support a second end of the aerodynamic shield and to have a second position that is fixed relative to the structural member in the y-direction and the z-direction.

In an embodiment, the first support bracket assembly and the second support bracket assembly are each configured to form a rounded shoulder extending away along the x-direction from the first end and the second end of the aerodynamic shield, respectively.

In an embodiment, the aerodynamic shield has a length extending between a leading edge and a trailing edge, a height extending between an upper surface and a lower surface, and a ratio of the height to the length of between about 1.0 and about 0.1, e.g., between about 0.5 and about 0.25, or about 0.33.

In an embodiment, the second support bracket assembly is configured to remain unconstrained in the x-direction relative to the structural member.

In an embodiment, the first clamp is configured to fix the first position of the first support bracket assembly in the x-direction using one of an end flange clamp and a U-clamp.

In an embodiment, the first support bracket assembly is configured to fix the first position of the first support bracket assembly in the y-direction using one of a web clamp and a U-clamp. In an embodiment, the first support bracket assembly is configured to fix the first position of the first support bracket assembly in the y-direction using the web clamp, wherein the web clamp is configured to extend through a web of the structural member. In an embodiment, the first support bracket assembly is configured to fix the first position of the first support bracket assembly in the y-direction using the web clamp, wherein the web clamp comprises a sub-clamp that is adjustably coupled with an adjustable web pad, the adjustable web pad and the sub-clamp being configured to remain separated by a gap when the adjustable web pad clamps a web of the structural member. In an embodiment, the first support bracket assembly is configured to fix the first position of the first support bracket assembly in the z-direction using one of an outer flange clamp and a locking mechanism having a locking arm configured to contact an outer flange of the structural member. In an embodiment, the second support bracket assembly is configured to fix the second position of the second support bracket assembly in the y-direction using a second web clamp. In an embodiment, the second support bracket assembly is configured to fix the second position of the second support bracket assembly in the z-direction using one of a second outer flange clamp and a second locking mechanism having a second locking arm.

In an embodiment, the first clamp is an end flange clamp that is adjustably coupled with a first sub-clamp and a second sub-clamp. In an embodiment, the first clamp is configured to remain separated by a gap from the first sub-clamp when the first clamp is clamped to an end flange of the structural member.

In another aspect, the present disclosure provides an acoustic noise reduction system for an aircraft landing gear having a structural member. The acoustic noise reduction system includes an aerodynamic shield, a first support bracket assembly, and a second support bracket assembly. The first support bracket assembly is configured to support a first end of the aerodynamic shield and to couple with the structural member, and has a first clamp that is configured to fix a position of the first support bracket assembly relative to the structural member in an x-direction that is substantially parallel to a longitudinal direction of first structural member. The second support bracket assembly is configured to support a second end of the aerodynamic shield, to couple with the structural member, and to remain unconstrained in the x-direction relative to the structural member.

In an embodiment, the first support bracket assembly and the second support bracket assembly are each configured to form a shoulder extending away along the x-direction from the first end and the second end of the aerodynamic shield, respectively.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this claimed subject matter will become more readily appreciated as the same become better understood by reference to the following detailed description, when taken in conjunction with the accompanying drawings, wherein:

DETAILED DESCRIPTION

The present disclosure provides examples of shield assemblies that are configured to reduce aerodynamic noise associated with an aircraft landing gear system. The features described with respect to each representative embodiment herein (including shield assemblies and mechanisms to fix the x-, y-, and/or z-positions of a shield assembly) may generally be combined or alternated with features of other embodiments.

Figure 1:
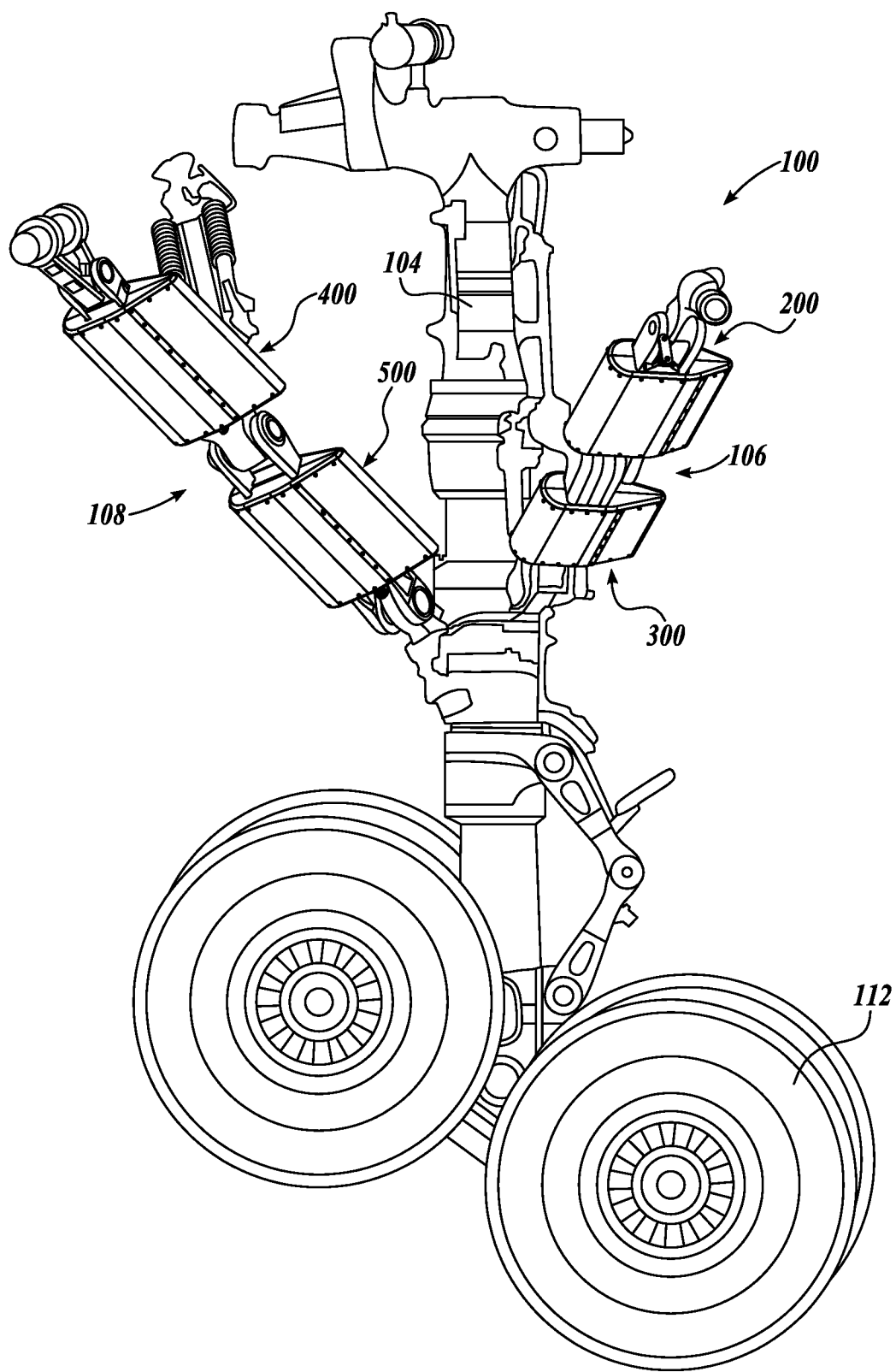
FIG. 1 is a perspective view of an aircraft landing gear equipped with shield assemblies, in accordance with one embodiment of the present disclosure.

FIG. 1 illustrates a representative embodiment of a landing gear system 100 in accordance with the present disclosure. The landing gear system 100 includes a shock strut 104, a side brace assembly 106, and a drag brace assembly 108, each of which are configured at their upper ends for connection to an aircraft (not shown). One or more wheels 112 are connected to a lower end of the shock strut 104. In FIG. 1, the landing gear system 100 is in the gear-down state, in which the one or more wheels 112 are positioned to support the aircraft during takeoff, taxiing, and landing.

The side brace assembly 106 and the drag brace assembly 108 each include a plurality of structural members or links (e.g., I-beams) having recesses, raised portions, flat surfaces, apertures, irregularities and/or other characteristics that, left unshielded, could cause an unacceptable level of aerodynamic noise when passing through the air at speed (e.g., on approach for landing). To reduce this aerodynamic noise, each of the side brace assembly 106 and the drag brace assembly 108 includes one or more acoustic shield assemblies that are fitted with an aerodynamic shield (or foil). For example, the side brace assembly 106 includes an upper side brace shield assembly 200 and a lower side brace shield assembly 300. Likewise, the drag brace assembly 108 includes an upper drag brace shield assembly 400 and a lower drag brace shield assembly 500. Each shield assembly covers at least part of one structural member (e.g., an I-beam structural member). Each shield assembly includes a shield having an aerodynamic shape that is configured to reduce aerodynamic noise as compared with unshielded structural members.

Although the landing gear system 100 includes the side brace assembly 106 and the drag brace assembly 108, and is shown to include two shield assemblies associated with each of the side brace assembly 106 and the drag brace assembly 108, the present disclosure is not limited to such landing gear systems. It shall be appreciated that the shield assemblies described herein are applicable to a wide variety of landing gear systems. For example, the shield assemblies described herein may be applied to additional and/or alternative structural members or other components of an aircraft landing gear system. For example, the shield assemblies described herein with respect to the side brace assembly 106 may be applied to the drag brace assembly 108, and vice versa. As another example, an aircraft landing gear system with one shield assembly is within the scope of the present disclosure. As another example, an aircraft landing gear system with more than four shield assemblies is within the scope of the present disclosure. As yet another example, the shield assemblies may be applied to the shock strut, torque links, beams and/or other braces of an aircraft landing gear system.

Figure 2A:
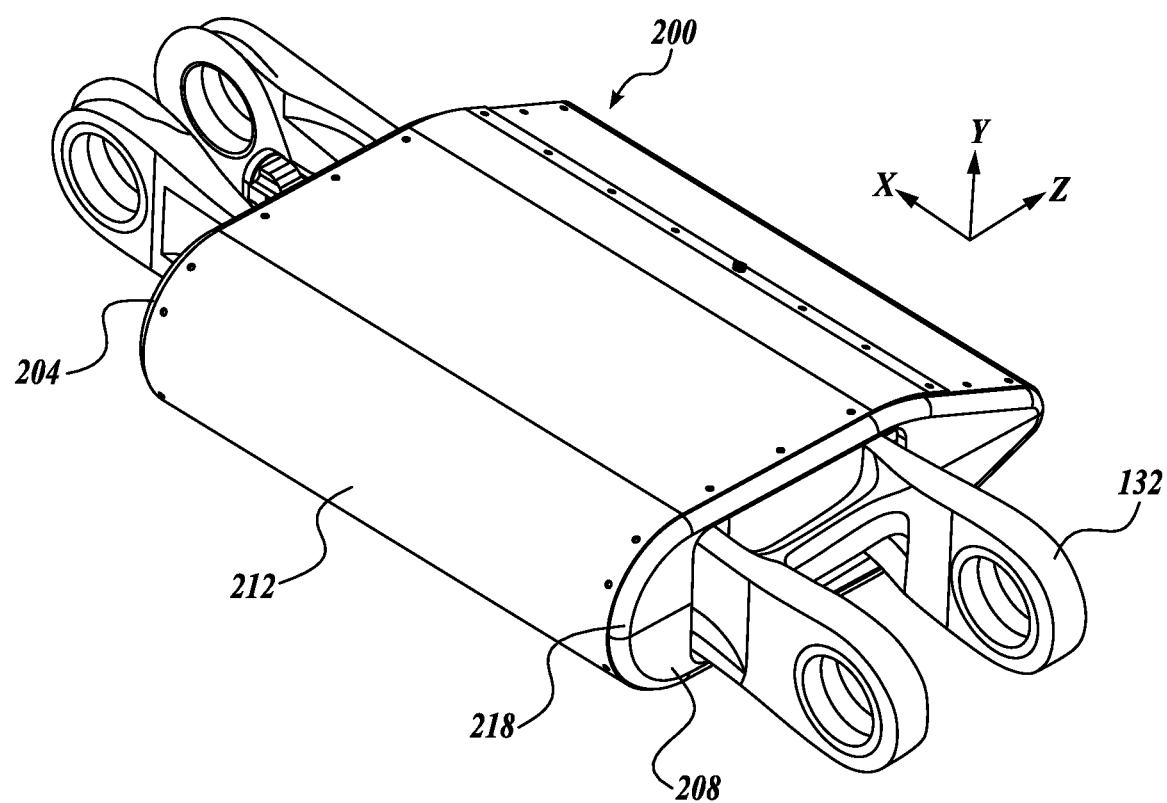
FIG. 2A is a perspective view of an upper side brace shield assembly of the landing gear of FIG. 1, in accordance with one embodiment of the present disclosure.
Figure 2B:
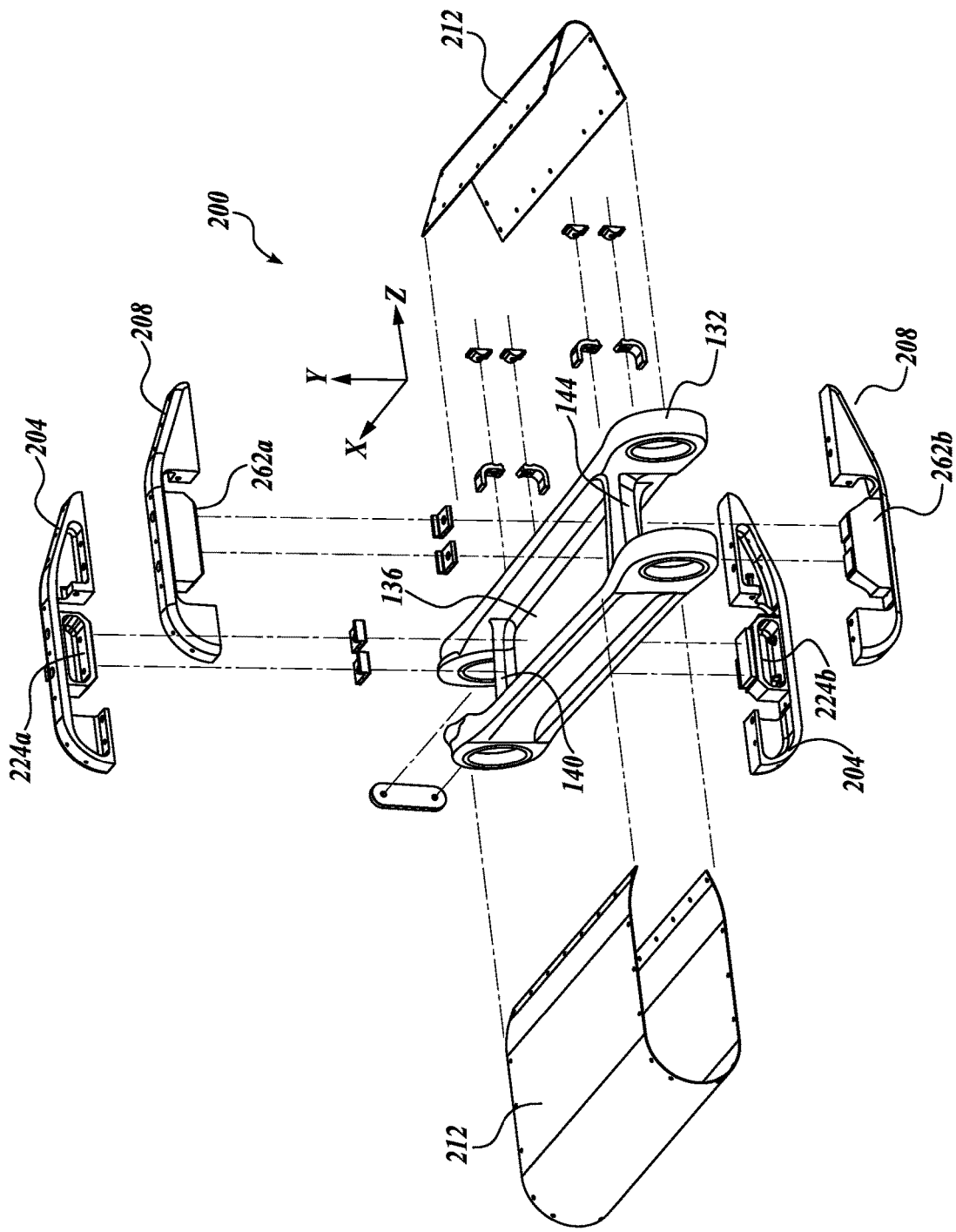
FIG. 2B is an exploded perspective view of the upper side brace shield assembly of FIG. 2A.

FIGS. 2A and 2B show a representative embodiment of the upper side brace shield assembly 200. As shown in FIGS. 2A and 2B, the upper side brace shield assembly 200 is mounted upon an upper side brace structural member or link 132 having a web 136 extending between an upper flange 140 and a lower flange 144 (both "end flanges"). The upper side brace shield assembly 200 includes an upper support bracket assembly 204 (hereinafter "upper support bracket 204") and a lower support bracket assembly 208 (hereinafter "lower support bracket 208"). Both the upper support bracket 204 and the lower support bracket 208 are configured to couple with an aerodynamic shield 212 (hereinafter "shield 212") that extends between the upper support bracket 204 and the lower support bracket 208. The shield 212 is also configured to extend around a perimeter of the upper support bracket 204 and around a perimeter of the lower support bracket 208.

To facilitate attachment to the upper side brace structural member 132, the upper support bracket 204 and the lower support bracket 208 may each be formed from two or more pieces (see FIG. 2B). The upper and lower support brackets 204, 208 are at least partially formed from one or more high strength materials, such as 7075 aluminum alloy plate or comparable materials. To improve aerodynamics, in some embodiments, each of the first and second brackets 204, 208 extend (protrude) outwardly away from the ends of the shield 212. That way, the first and second brackets 204, 208, form shoulders 218 (hidden with respect to first bracket 204) as shown in FIG. 2A on either end of the shield 212, such that the whole upper side brace shield assembly 200 has a seamless outer profile. In some embodiments, each of the upper support bracket 204 and the lower support bracket 208 have rounded outer edges (i.e., rounded shoulders), to further improve aerodynamics. Some embodiments may include only two brackets, i.e., no intermediate support brackets in between the first and second support brackets 204, 208.

The shield 212 has an aerodynamic cross sectional shape, such as a teardrop shape, an airfoil shape, or other shape having a leading edge and a trailing edge. The cross sectional shape of the shield 212 may be optimized for a particular airspeed that is associated with a particular aircraft. For example, the shield has a length extending between a leading edge and a trailing edge, and a height extending between an upper surface and a lower surface. In some embodiments, the shield may have a cross sectional shape with a height-to-length ratio of between about 1.0 to about 0.1. In some embodiments, the shield has a height-to-length ratio of between about 0.8 and about 0.2, or between about 0.6 and about 0.2 in some embodiments, or between about 0.25 and about 0.5 in some embodiments, or between about 0.3 and about 0.4 in some embodiments. In some embodiments, the shield has a height-to-length ratio of about 0.5, about 0.33, about 0.3, about 0.25, or about 0.2. Such height-to-length ratios have demonstrated improved airflow. In some embodiments, the shield 212 may have a circular or ovular cross sectional shape.

In the non-limiting illustrated embodiment shown in FIG. 2B, the shield 212 has a multi-piece construction (i.e., a fore shield and an aft shield) to facilitate installation and service, although some embodiments may include one-piece shields. The shield 212 is couplable with the upper support bracket 204 and the lower support bracket 208 via plurality of fasteners, e.g., bolts, screws, and/or rivets. Reversible fasteners are preferable to facilitate installation and service although more permanent fastening techniques may be employed. Other shields described herein have similar features. The shield 212 is at least partially formed from one or more materials having relatively high strength and relatively light weight, such as 2024 aluminum alloy or comparable materials. In some embodiments, the shield may be configured to fold in upon itself (e.g., in the x-direction), in order to facilitate retraction of the landing gear system into the gear-up position.

As described in more detail below, the upper support bracket 204 engages the upper flange 140 of the upper side brace structural member 132 utilizing different mechanisms to fix its position in the x-, y-, and z-directions. The lower support bracket 208 engages the upper side brace structural member 132 near the lower flange 144 utilizing different mechanisms to fix its position in the y- and z-directions, leaving the lower support bracket 208 free to move in the x-direction (i.e., along a longitudinal direction of the upper side brace structural member 132). By not constraining the lower support bracket 208 in the x-direction, the upper side brace shield assembly 200 is free to expand or contract along that direction, e.g., from thermal expansion, etc.

As used herein, the x-direction generally corresponds to a longitudinal direction of the structural member to which the support bracket is coupled (e.g., forward and backward movement along an axis that is substantially parallel to the longitudinal direction of the structural member). The y-direction generally corresponds to a direction that is normal to the x-direction and normal to a web of the structural member (e.g., movement along an axis that is substantially normal to the x-direction and normal to the web of the structural member). The z-direction generally corresponds to a direction that is normal to the x- and y-directions, and is parallel to the web of the structural member (e.g., movement along an axis that is substantially normal to the x- and y-directions, and substantially parallel to the web of the structural member).

Generally, shield assemblies of the present disclosure include combinations of mechanisms that substantially fix a first support bracket of the shield assembly with respect to the x-, y-, and z-directions (relative to a structural member), and substantially fix a second support bracket of the shield assembly with respect to the y- and z-directions, but not the x-direction. This configuration prevents the shield (e.g., the shield 212) from warping and facilitates installation and maintenance. Nevertheless, the present disclosure contemplates embodiments in which the first and second support bracket assemblies are both fixed in the x-, y-, and z-directions.

Figure 2C:
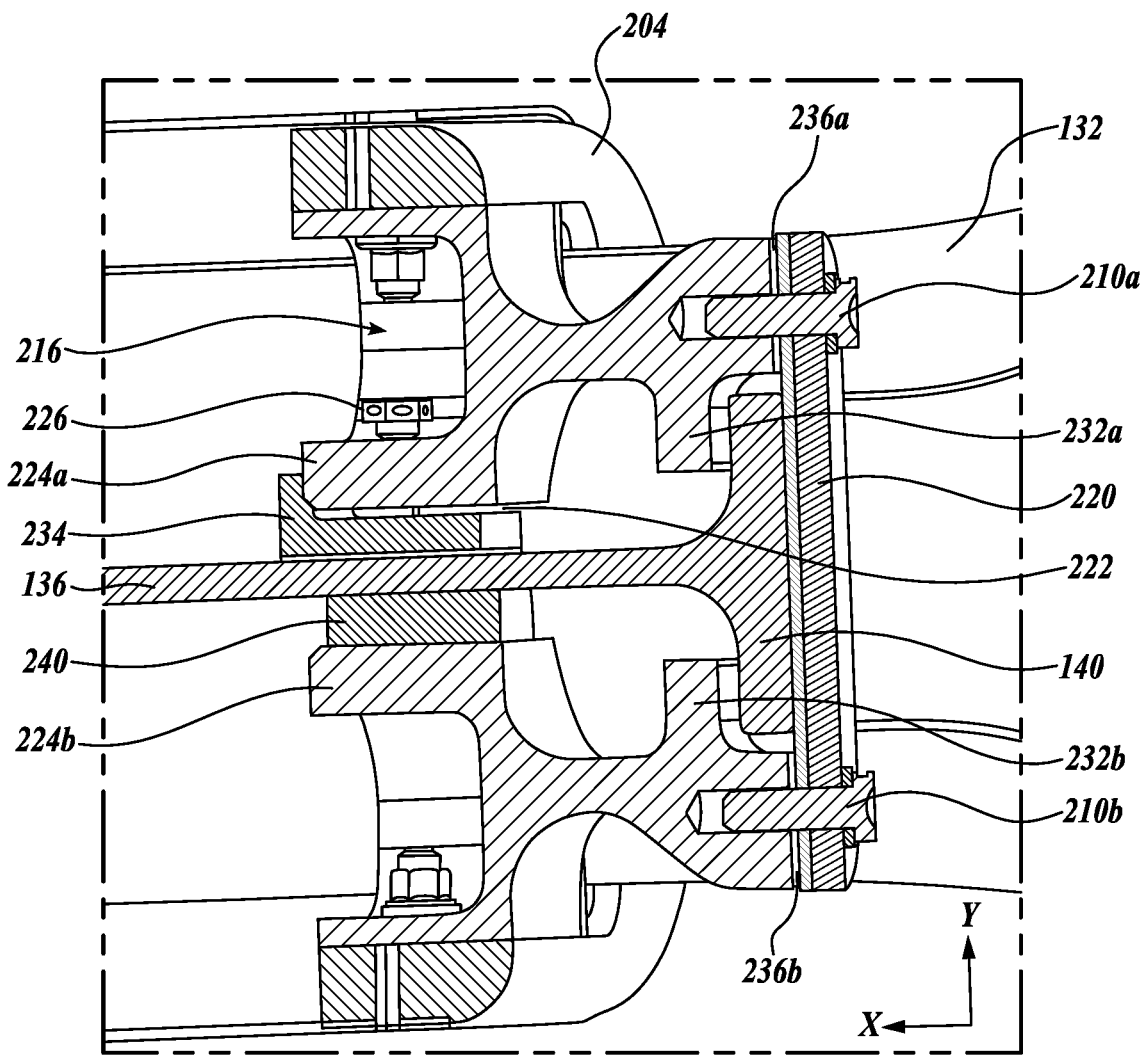
FIG. 2C is a partial section view of the upper side brace shield assembly of FIG. 2A, showing representative mechanisms for fixing the position of a shield assembly relative to a structural member.

FIG. 2C shows representative mechanisms for fixing the x- and y-position of a shield assembly relative to a structural member. In particular, FIG. 2C shows a partial section view showing how the upper support bracket 204 fixes its position in the x- and y-directions relative to the upper side brace structural member 132. Representative mechanisms for fixing the z-position of a shield assembly relative to a structural member will be described in more detail with regard to FIGS. 2D and 4C. Although not shown in FIG. 2C, the upper support bracket 204 is fixed in the z-position utilizing a mechanism as described below with respect to FIG. 2D. Thus, the upper support bracket 204 is fixed in the x-, y-, and z-directions.

In the embodiment shown in FIG. 2C, the upper support bracket 204 includes a web clamp 216 (for fixing the y-direction position) and a flange clamp 220 (for fixing the x-direction position). The web clamp 216 adjustably clamps the web 136 of the upper side brace structural member 132. Similarly, the flange clamp 220 adjustably clamps the upper flange 140 (an end flange) of the upper side brace structural member 132. It can therefore be referred to as an end flange clamp. In some embodiments, the flange clamp 220 adjustably clamps the lower flange 144 (also an end flange), instead of the upper flange 140. While the web clamp 216 is shown in detail with respect to the upper support bracket 204 in FIG. 2C, a similar web clamp is utilized as part of the lower support bracket 208.

As shown in FIG. 2C, the web clamp 216 is formed partially from a first sub-clamp 224a that is rigidly connected to a second sub-clamp 224b via the flange clamp 220. That is, the flange clamp 220 not only serves an important clamping function, but also serves as a connecting bridge/support bar between the first sub-clamp 224a and the second sub-clamp 224b. In the non-limiting illustrated embodiment, each of the first sub-clamp 224a and the second sub-clamp 224b are couplable to the upper support bracket 204 to facilitate manufacturing, installation, and service.

The first sub-clamp 224a is adjustably coupled with an adjustable web pad 234 that is configured to engage the web 136. The adjustable web pad 234 is adjustable in the y-direction via threaded adjuster 226, and is spaced away from the first sub-clamp 224a by a gap 222 to account for different manufacturing build tolerances and to ensure that, in use, suitable pressure is applied to the web 136. The second sub-clamp 224b includes a fixed web pad 240 that is configured to engage an opposite side of the web 136 as compared to the adjustable web pad 234. Some embodiments may include two adjustable web pads, rather than an adjustable web pad and a fixed web pad.

The adjustable web pad 234 and the fixed web pad 240 are each configured to directly contact the web 136. Accordingly, a web-facing portion of each may be formed at least partially from a relatively soft material such as Delrin 527 UV, ethylene propylene rubber, or similar material in order to prevent damage to the upper side brace structural member 132. For example, each of the adjustable web pad 234 and the fixed web pad 240 may include a relatively soft contact pad formed from one of the above materials. Unless expressly stated otherwise, any component and any shield assembly described herein that is configured for direct contact with a structural member of the landing gear system, such as any contact pad or contact surface, may be at least partially formed from one of the relatively soft materials as described above. It shall be understood that any component that is configured to clamp onto or abut a structural member may include a contact pad formed of such materials, even if not expressly stated. For strength, each of the adjustable web pad 234 and the fixed web pad 240 may have a reinforced component formed from one or more relatively high strength materials such as 17-4 PH steel or comparable materials, or may be adjacent to another component formed of such material.

The flange clamp 220 is adjustably coupled with the first sub-clamp 224a and the second sub-clamp 224b by threaded adjustment members 210a, 210b. The first sub-clamp 224a includes a first abutment 232a, and the second sub-clamp 224b includes a second abutment 232b. Each of the first abutment 232a and the second abutment 232b includes a relatively soft contact pad as described above. In use, the threaded adjustment members 210a, 210b may be adjusted such that the flange clamp 220, first abutment 232a, and second abutment 232b clamp against the upper flange 140. As shown, the flange clamp 220 is spaced away from the first sub-clamp 224a and from the second sub-clamp 224b by gaps 236a, 236b to account for different manufacturing build tolerances and to ensure that, in use, suitable pressure is applied to the upper flange 140. In the illustrated embodiment, the flange clamp 220 also includes a contact pad.

Figure 2D:
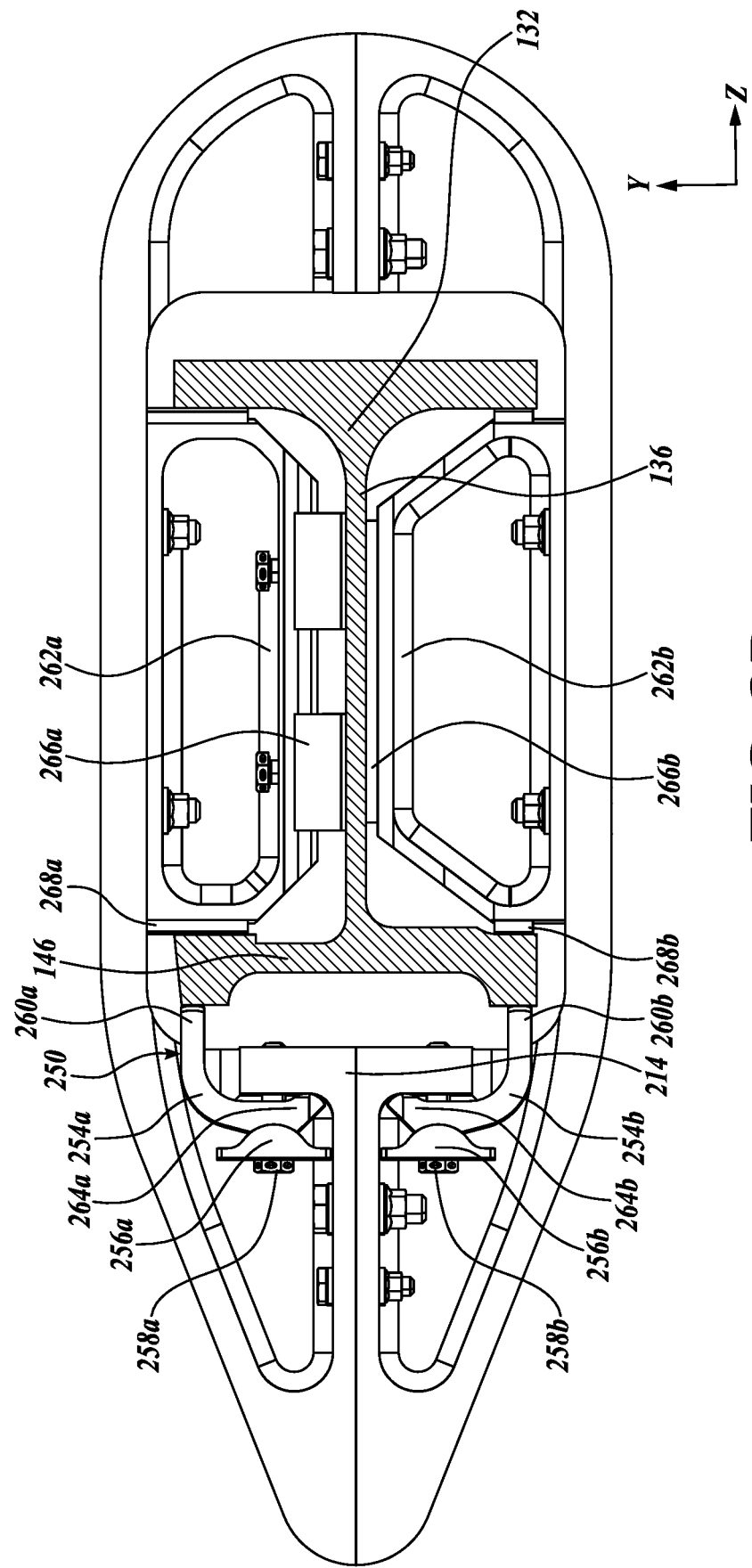
FIG. 2D is another partial section view of the upper side brace shield assembly of FIG. 2A, showing additional representative mechanisms for fixing the position of a shield assembly relative to a structural member.

FIG. 2D shows representative mechanisms for fixing the y- and z-positions of a shield assembly relative to a structural member. In particular, FIG. 2D shows how the lower support bracket 208 utilizes a locking mechanism 250 to fix its position in the y- and z-directions relative to the upper side brace structural member 132. The lower support bracket 208 is unrestrained in the x-direction. The upper support bracket 204 utilizes a similar locking mechanism as the locking mechanism 250 to secure its z-position. The locking mechanism 250 described below with respect to the lower support bracket 208 interfaces with an outer flange 146, formed as a lug, of the upper side brace structural member 132. Similar locking mechanisms can be configured to interface with other flanges however.

The locking mechanism 250 includes a plurality of L-shaped locking arms 254a, 254b and rocker bushings 256a, 256b. Each locking arm 254a, 254b is paired with one of the rocker bushings 256a, 256b, and is adjustably secured to a T-shaped portion 214 of the lower support bracket 208 by one of the adjustment bolts 258a, 258b. Each locking arm 254a, 254b has a flange end portion 260a, 260b that is configured to contact the outer flange 146 of the upper side brace structural member 132.

In the non-limiting illustrated embodiment, the locking arms 254a, 254b (in addition to clamps, bridges, and support bars described herein) are formed, for example, at least partially from high-strength material such as 300M steel or similar material. The rocker bushings 256a, 256b are at least partially formed from Al—Ni-Bronze or similar material, for example. In an embodiment, the flange end portion 260a, 260b has an optional contact pad formed from silicone rubber or similar material in order to protect the upper side brace structural member 132.

The locking mechanism 250 also includes a plurality of brace fittings 262a, 262b that are configured to fix the y-position of a shield assembly relative to a structural member. In particular, the brace fittings 262a, 262b join with the lower support bracket 208, such that in use, they are located on opposite sides of the web 136 of the upper side brace structural member 132. Each brace fitting 262a, 262b includes at least one web contact portion 266a, 266b and at least one outer flange contact portion 268a, 268b. The illustrated brace fittings 262a, 262b each include two outer flange contact portions. The web contact portions 266a, 266b are configured to restrain y-axis movement, and the outer flange contact portions 268a, 268b are configured to aid in restraint of z-axis movement. The brace fittings 262a, 262b are, for example, at least partially formed from one or more materials having relatively high strength and relatively light weight, such as 7075 aluminum alloy or comparable materials.

In use, the locking arms 254a, 254b cooperate with the brace fittings 262a, 262b to constrain y- and z-direction movement of the upper side brace structural member 132 relative to the lower support bracket 208. To account for different manufacturing build tolerances and to ensure that suitable pressure is applied to the upper side brace structural member 132, each locking arm 254a, 254b is adjustable. In particular, tightening the adjustment bolts 258a, 258b causes each locking arm 254a, 254b to pivot about a base end portion 264a, 264b.

Thus, the upper support bracket 204 of the upper side brace shield assembly 200 is fixed in the x- and y-directions as shown in FIG. 2C, and in the z-direction utilizing a locking mechanism similar to that shown in FIG. 2D. The lower support bracket 208 of the upper side brace shield assembly 200 is unrestrained in the x-direction, and is fixed in the y- and z-directions with a locking mechanism as shown in FIG. 2D.

Referring to FIGS. 2A-2D, an installation method of the shield assembly 200 is as follows. The upper support bracket 204 is loosely installed on the upper side brace structural member 132 by partially tightening the web clamp 216, the flange clamp 220, and a locking mechanism similar to locking mechanism 250 of FIG. 2D. The lower support bracket 208 is loosely installed on the upper side brace structural member 132 by partially tightening the locking mechanism 250. With the lower support bracket 208 free to move in the x-direction, a portion of the shield 212 is installed between the upper support bracket 204 and the lower support bracket 208 in order to determine a correct distance between the two support brackets 204, 208. Once the correct distance is determined, the clamps and locking mechanisms of each support bracket 204, 208 are fully tightened to the correct tightness. In addition, the remaining portion(s) of the shield 212 is installed to complete the installation.

Once these steps are complete, the upper side brace shield assembly 200 is fully installed on the upper side brace structural member 132. That is, the upper support bracket 204 is constrained relative to the upper side brace structural member 132 in the x- and y-directions as shown in FIG. 2C, and in the z-direction with a mechanism similar to the locking mechanism 250 shown in FIG. 2D. The lower support bracket 208 is unconstrained in the x-direction, and is constrained in the y- and z-directions as shown in FIG. 2D to allow for thermal expansion and contraction. To uninstall the shield assembly 200, a reverse procedure may be executed. Other shield assemblies described herein may be installed/uninstalled by carrying out similar methods.

Figure 3A:
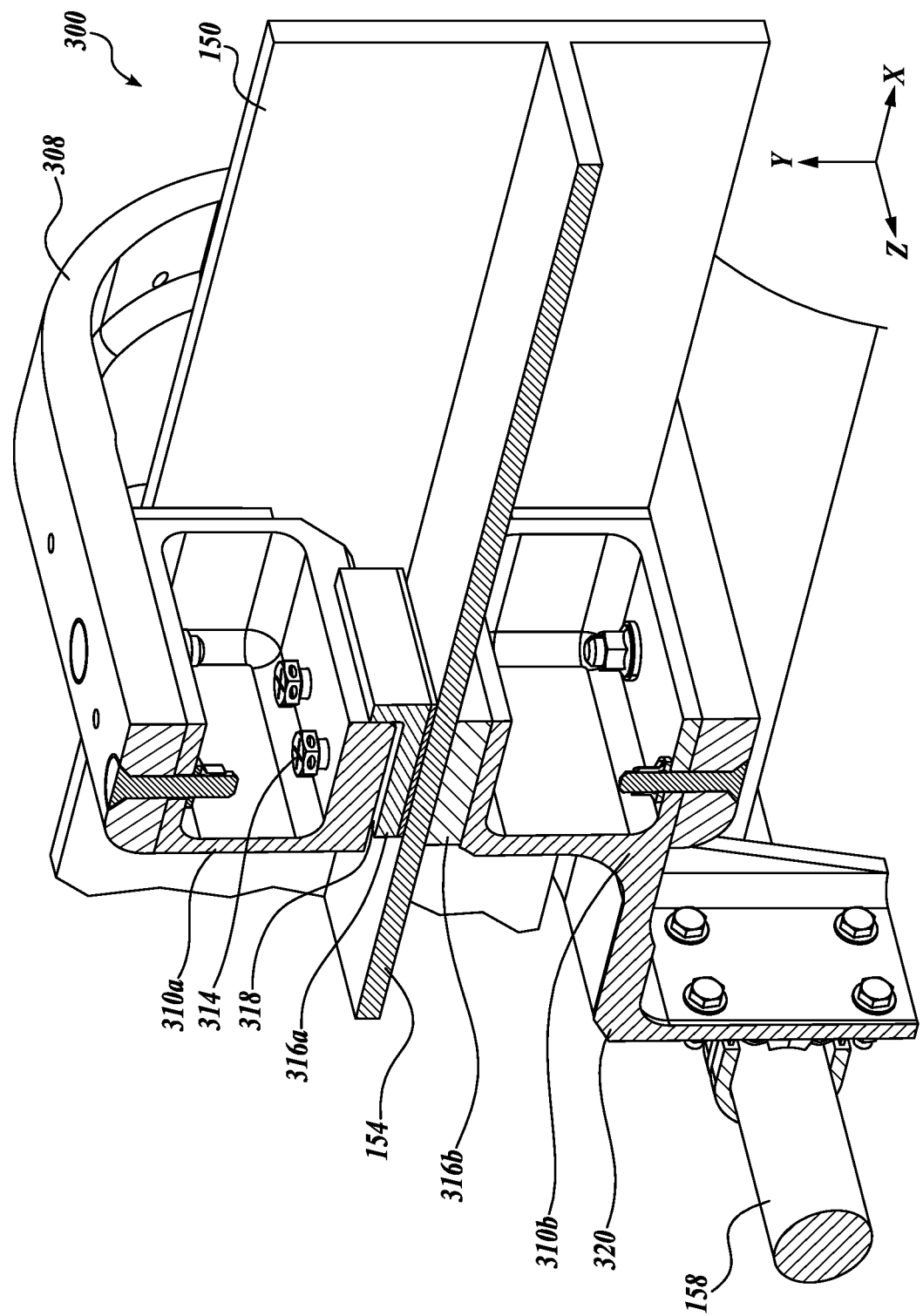
FIG. 3A is a partial section view of a lower side brace shield assembly of the landing gear of FIG. 1, showing additional representative mechanisms for fixing the positions of a shield assembly relative to a structural member, in accordance with another embodiment of the present disclosure.

FIG. 3A shows another representative mechanism for fixing the y-position of a shield assembly relative to a structural member. In particular, FIG. 3A shows a portion of the lower side brace shield assembly 300 that prevents y-direction movement of a lower side brace structural member or link 150 relative to the lower side brace shield assembly 300. Similar to the upper side brace shield assembly 200, the lower side brace shield assembly 300 includes an upper support bracket (not shown) and a lower support bracket 308 that are configured to support a shield 312 having an aerodynamic foil shape. Although not shown in detail, the upper support bracket is unrestrained in the x-direction, and utilizes a locking mechanism similar to that shown in FIG. 2D to restrain its y- and z-positions.

FIG. 3A shows the lower support bracket 308, which is restrained in the x-, y-, and z-directions. A plurality of brace fittings 310a, 310b that couple with the lower support bracket 308 such that, in use, they are located on opposite sides of a web 154 of the lower side brace structural member 150. Brace fitting 310a is adjustably coupled with an adjustable web pad 316a via at least one adjustment member 314. Brace fitting 310b is coupled with a fixed web pad 316b. Both web pads 316a, 316b are configured to engage the web 154. The adjustable web pad 316a is spaced away from the brace fitting 310a by a gap 318 to account for different manufacturing build tolerances and to ensure that, in use, suitable pressure is applied to the web 154. The fixed web pad 316b is configured to engage an opposite side of the web 154 as compared to the adjustable web pad 316a. Some embodiments may include two adjustable web pads, rather than one adjustable web pad and one fixed web pad. Both web pads 316a, 316b are configured to directly contact the web 154.

Figure 3B:
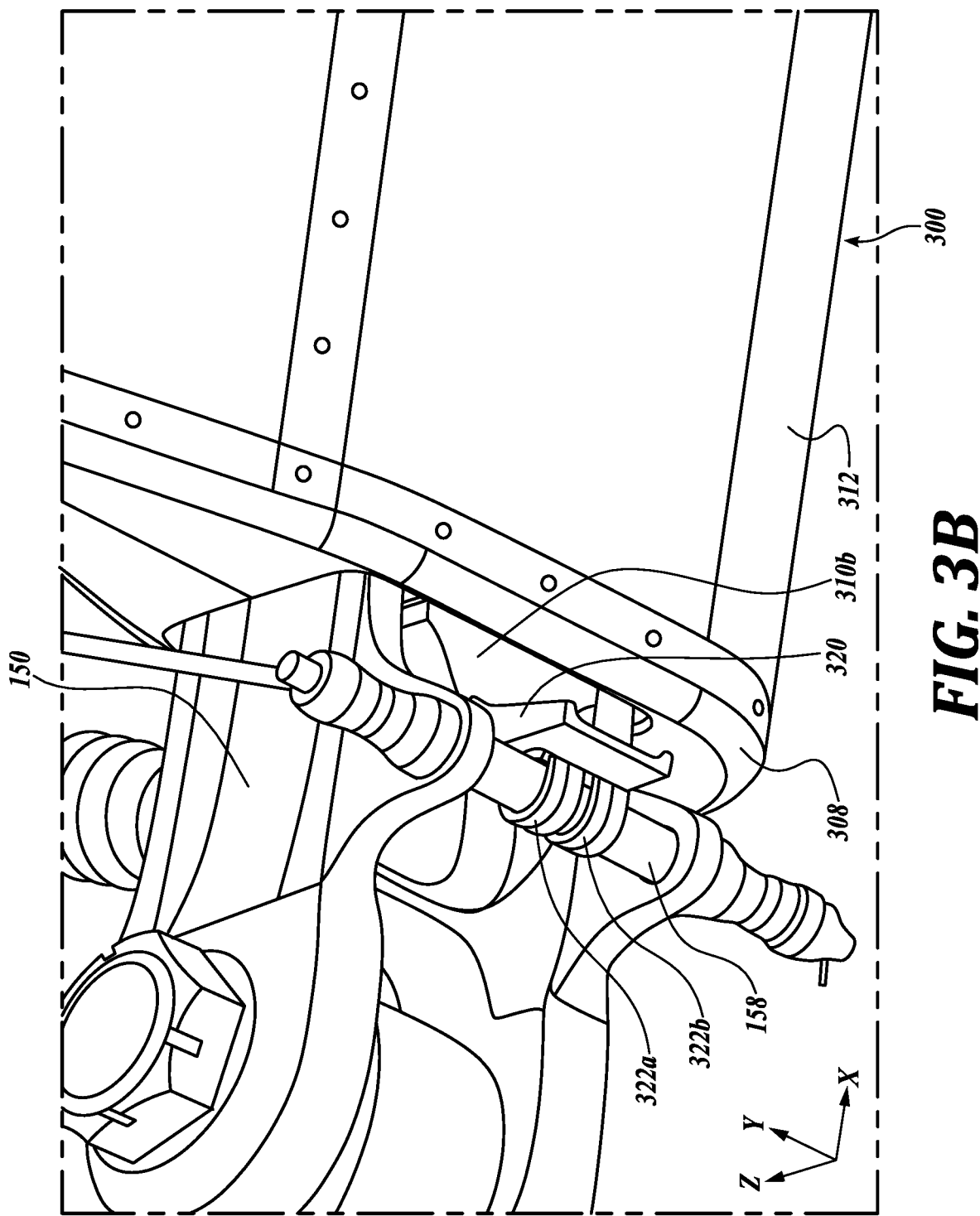
FIG. 3B is a partial perspective view of the lower side brace shield assembly of the FIG. 3A, showing additional representative mechanisms for fixing the position of a shield assembly relative to a structural member.

FIG. 3B shows another representative mechanism for fixing the x- and y-position of a shield assembly relative to a structural member. In particular, FIG. 3B shows another view of the lower support bracket 308 and the brace fitting 310b. The brace fitting 310b includes a protrusion 320 extending away from the lower support bracket 308 in at least the x-direction (see also FIG. 3A). A pair of U-clamps 322a, 322b are removably coupled to the protrusion 320. In use, the clamps 322a, 322b clamp onto a structural element 158 that is coupled with the lower side brace structural member 150. In this way, the clamps 322a, 322b prevent the lower support bracket 308—and the lower side brace shield assembly 300—from moving in the x- or y-directions relative to the lower side brace structural member 150.

Thus, the lower support bracket 308 of the lower side brace shield assembly 300 is fixed in the x- and y-directions as shown in FIGS. 3A and 3B, and is fixed in the z-direction utilizing a locking mechanism similar to that shown in FIG. 2D. The upper support bracket of the lower side brace shield assembly 300, although not shown in detail, is unrestrained in the x-direction and is restrained in the y- and z-directions utilizing a locking mechanism similar to that shown in FIG. 2D.

The side brace shield assemblies 200, 300 described above are generally configured for coupling with closed-web structural shapes (e.g., the upper side brace structural member 132 is an I-beam). Nevertheless, certain of the mechanisms shown in FIGS. 1-3B with respect to the side brace shield assemblies 200, 300 are also configured for use with open-web (i.e., ladder type) structural shapes. By comparison, the drag brace shield assemblies 400, 500 and certain mechanisms thereof are generally configured for coupling with open-web structural shapes, as will be described in more detail below. Nevertheless, certain of the mechanisms shown in FIGS. 4A-4C with respect to the upper drag brace shield assembly 400 (which is similar to the lower drag brace shield assembly 500) are also configured for use with closed-web structural shapes.

Figure 4A:
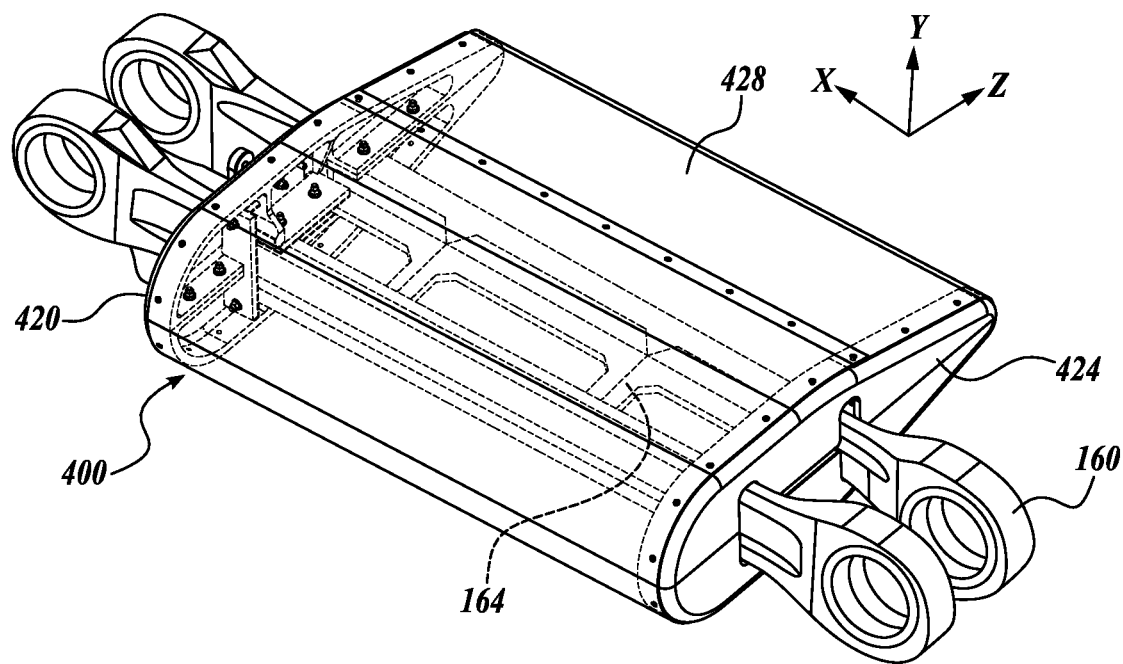
FIG. 4A is a perspective view of an upper drag brace shield assembly of the landing gear of FIG. 1, in accordance with one embodiment of the present disclosure.
Figure 4B:
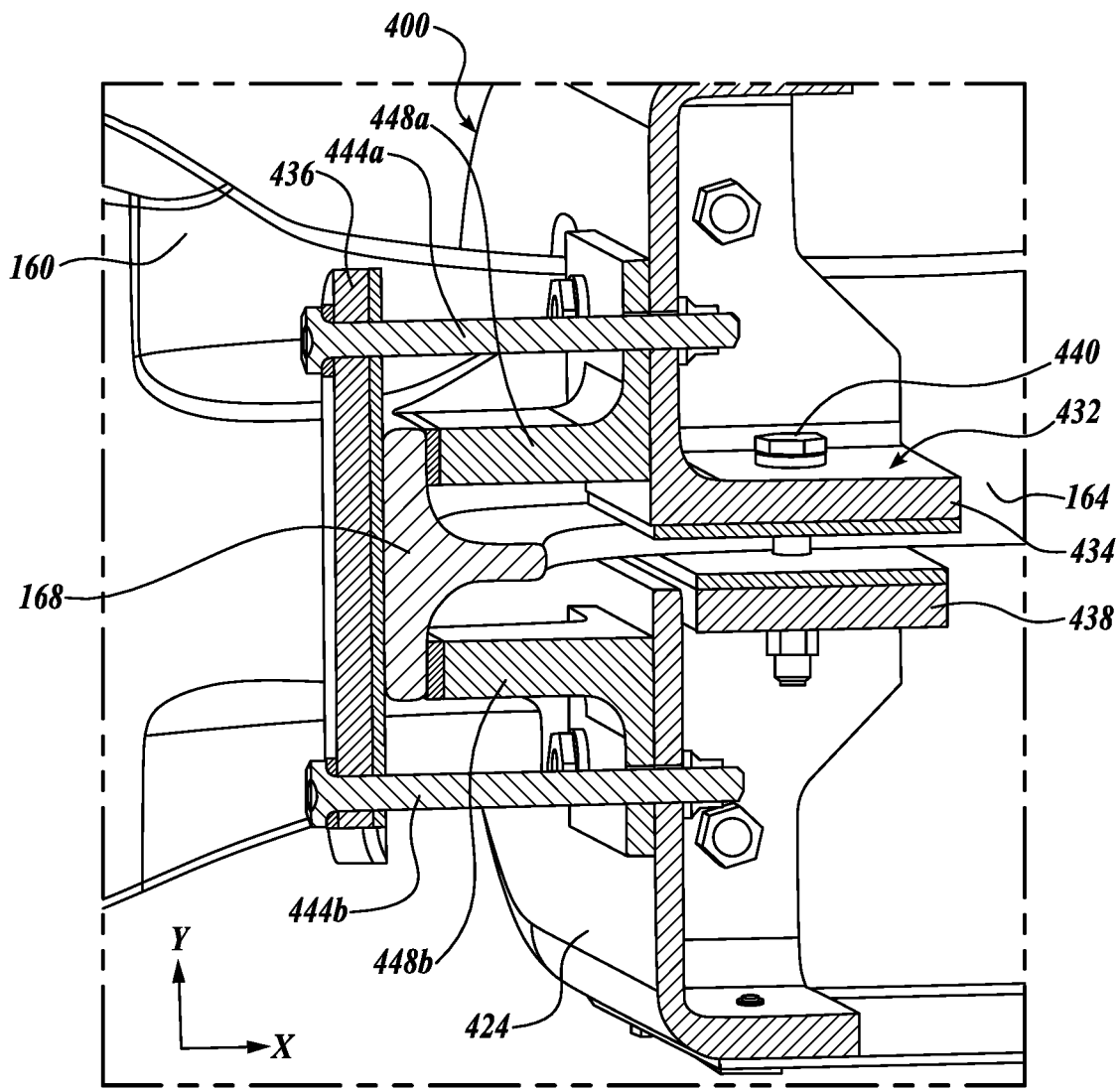
FIG. 4B is a partial section view of the upper drag brace shield assembly of FIG. 4A, showing additional representative mechanisms for fixing the position of a shield assembly relative to a structural member.
Figure 4C:
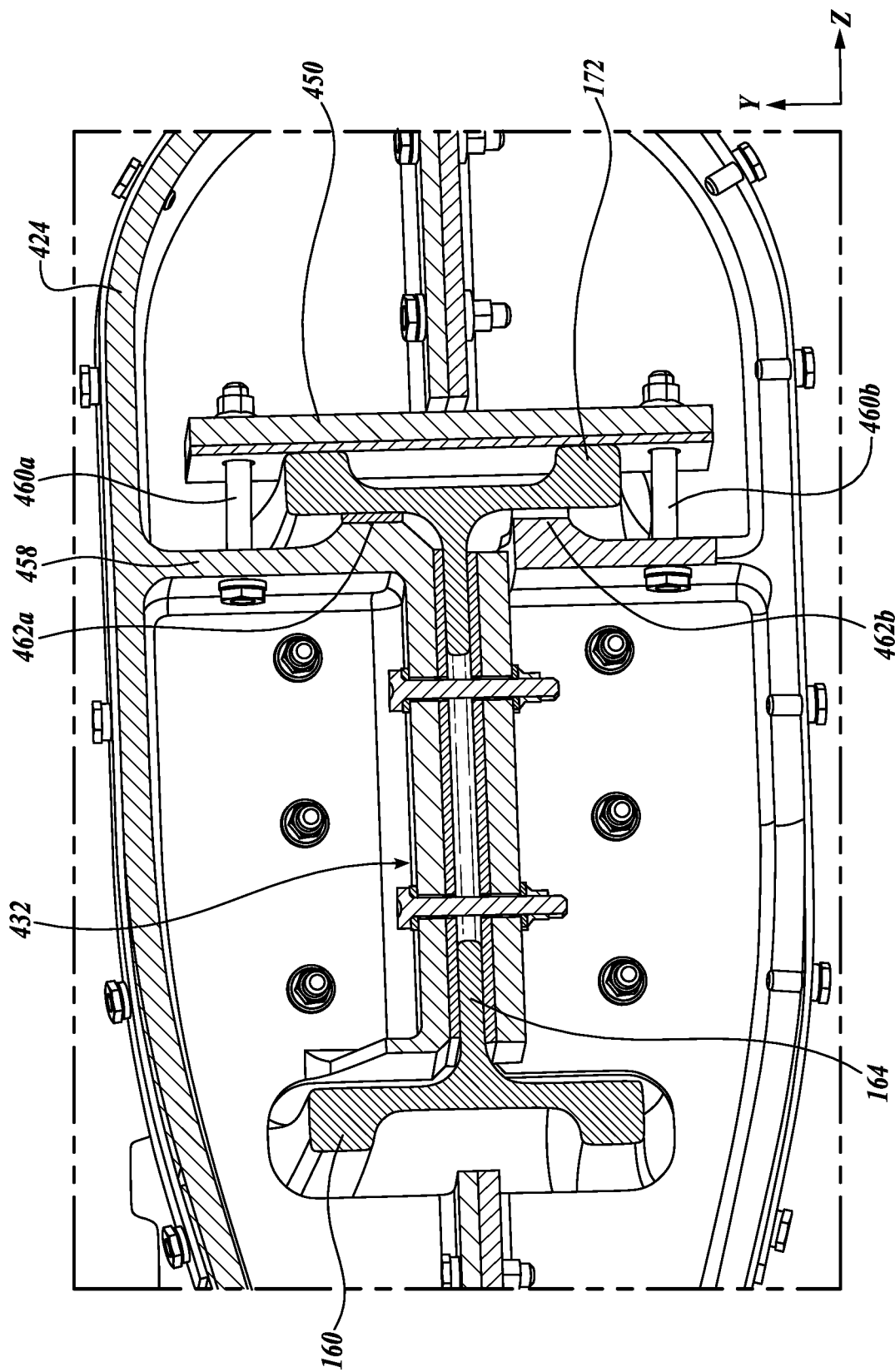
FIG. 4C is another partial section view of the upper drag brace shield assembly of FIG. 4A, showing representative mechanisms for fixing the positions of a shield assembly relative to a structural member.

FIG. 4A shows an example of the upper drag brace shield assembly 400, which is configured to couple with an upper drag brace structural member or link 160 having an open web 164 extending between two end flanges (e.g., end flange 168 shown in FIG. 4B) and two outer flanges (e.g., outer flange 172 shown in FIG. 4C). As with the upper side brace shield assembly 200 and the lower side brace shield assembly 300, the upper drag brace shield assembly 400 includes an upper support bracket 420 and a lower support bracket 424. Both the upper support bracket 420 and the lower support bracket 424 are configured to support a shield 428 having an aerodynamic foil shape. The lower support bracket 424 is restrained in the x-, y-, and z-directions, while the upper support bracket 420 is unrestrained in the x-direction.

FIG. 4B shows representative mechanisms configured to fix the x- and y-position of a shield assembly relative to a structural member. In particular, FIG. 4B is a partial section view showing how the lower support bracket 424 fixes its position in the x- and y-directions relative to the upper drag brace structural member 160. In that regards, the lower support bracket 424 includes a web clamp 432 and a flange clamp 436. The web clamp 432 adjustably clamps the web 164 of the upper drag brace structural member 160.

The web clamp 432 includes a fixed web pad 434 and an adjustable web pad 438 that are configured to engage opposite sides of the open web 164. The adjustable web pad 438 couples with the fixed web pad 434 via a threaded adjustment member 440 that is configured to extend through the open web 164 (as compared with web clamp 216 described above with respect to the upper side brace shield assembly 200, which does not extend through the web). Some embodiments may include a plurality of threaded adjustment members, e.g., for the benefit of distributing pressure more evenly across the upper drag brace structural member 160. The adjustable web pad 438 may be adjusted relative to the fixed web pad 434 to account for different manufacturing build tolerances and to ensure that in use, suitable pressure is applied to the open web 164.

The flange clamp 436 is configured to adjustably clamp to the end flange 168 of the upper drag brace structural member 160. In particular, the flange clamp 436 is adjustably joined with the lower support bracket 424 via two adjustment members 444a, 444b. Additionally, a pair of abutments 448a, 448b are coupled with the lower support bracket 424, such that in use, they are positioned on opposite sides of the web 164 (relative to each other), and on opposite sides of the end flange 168 relative to the flange clamp 436. In use, the flange clamp 436 and the abutments 448a, 448b clamp against the lower flange 168. Each abutment 448a, 448b may include a relatively soft contact pad as described above. The flange clamp 436 not only serves an important clamping function, but also serves as a connecting bridge/support bar that adds strength to the lower support bracket 424.

FIG. 4C shows other representative mechanisms for fixing the y- and z-positions of a shield assembly relative to a structural member. In particular, FIG. 4C shows another aspect of the lower support bracket 424, including the web clamp 432 described above, and a flange clamp 450. As described above, the web clamp 432 fixes the y-direction position of the lower support bracket 424 relative to the upper drag brace structural member 160. The flange clamp 450 fixes the z-direction position of the lower support bracket 424 relative to the upper drag brace structural member 160. The flange clamp 450 is structurally similar to the flange clamp 436 described above. However, the flange clamp 450 is configured to clamp an outer flange of a structural support member, whereas the flange clamp 220 and the flange clamp 436 are configured to clamp flanges, such as lugs, located on an end of the structural member. The flange clamp 450 can therefore be referred to as an outer flange clamp.

In an embodiment, the flange clamp 450 is adjustably joined with an integral flange 458 of the lower support bracket 424 via two adjustment members 460a, 460b. The integral flange 458 includes a pair of integrally-formed abutments 462a, 462b that are configured to be positioned on opposite sides of the web 164 of the upper drag brace structural member 160. The flange clamp 450 and the abutments 462a, 462b are configured to engage opposite sides of the outer flange 172 of the upper drag brace structural member 160.

Thus, the lower support bracket 424 of the upper drag brace shield assembly 400 is fixed relative to the upper drag brace structural member 160 in the x- and y-positions as shown in FIGS. 4B and 4C, and in the z-position as shown in FIG. 4C. The upper support bracket 420 is unrestrained in the x-direction, and is restrained in the y- and z-directions utilizing a mechanism similar to that shown in FIG. 4C.

Although not described in detail, the lower drag brace shield assembly 500 shown in FIG. 1 includes a lower support bracket and an upper support bracket that are configured to couple with a structural member and to support an aerodynamic shield Like the lower support bracket 424 of the upper drag brace shield assembly 400, the lower support bracket of the lower drag brace shield assembly 500 is restrained relative to its corresponding structural member in the x-, y-, and z-positions with mechanisms similar to those shown in FIGS. 4B and 4C Like the upper support bracket 420 of the upper drag brace shield assembly 400, the upper support bracket of the lower drag brace shield assembly 500 is unrestrained in the x-direction, and utilizes a mechanism similar to that shown in FIG. 4C to restrain its position along the y- and z-directions.

Thus, the present disclosure provides shield assemblies that are couplable with structural members of aircraft landing gear systems in order to reduce aerodynamic noise. Each shield assembly generally includes an aerodynamic shield that is couplable with a first support bracket and a second support bracket. The first support bracket includes one or more mechanisms to fix its y- and z-positions relative to the structural member, and the second support bracket includes one or more mechanisms to fix its x-, y-, and z-positions relative to the structural member. This configuration enables, for example, expansion/contraction of the aerodynamic shied (e.g., thermal expansion), and facilitates installation and maintenance.

In an embodiment, a film, such as a polyester film, may be employed to protect surfaces of the side and/or drag braces that contact the shield. One example of a polyester film that can be applied to such surfaces includes biaxially-oriented polyethylene terephthalate.

While illustrative embodiments have been illustrated and described, it will be appreciated that various changes can be made therein without departing from the spirit and scope of the claimed subject matter. For example, a support bracket that is to be fixed in the x-, y-, and z-positions relative to the structural member may be formed integrally with the structurally member (e.g., an integral cast part), rather than a separate support bracket. In the description above, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

As used herein, the term "upper" means "nearer to the aircraft body in the gear-down position," while the term "lower" means "further away from the aircraft body in the gear-down position." These terms are intended to facilitate understanding, not to limit the orientation or configuration of the inventive systems in practice. For example, unless expressly limited, a feature described as being located on or near an "upper" or "lower" end may, in other embodiments, be located on or near the "lower" or "upper" end, respectively.

Further, it should be noted that for purposes of this disclosure, terminology such as "end," "inner," and "outer," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The present application may also reference quantities and numbers. Unless specifically stated, such quantities and numbers are not to be considered restrictive, but representative of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft landing gear shield assembly, comprising: an aerodynamic shield; a first support bracket assembly that is configured to couple with a structural member of an aircraft landing gear and to support a first end of the aerodynamic shield, the first support bracket assembly being configured to have a first position that is fixed relative to the structural member in an x-direction, a y-direction, and a z-direction, wherein the x-direction is substantially parallel to a longitudinal direction of the structural member, wherein the y-direction is normal to the x-direction, wherein the z-direction is normal to the x-direction and normal to the y-direction, the first support bracket assembly having a first clamp that is configured to fix the first support bracket assembly relative to the structural member in the x-direction; and a second support bracket assembly that is configured to support a second end of the aerodynamic shield and to have a second position that is fixed relative to the structural member in the y-direction and the z-direction, wherein the second support bracket assembly is configured to remain unconstrained in the x-direction relative to the structural member.

2. The aircraft landing gear shield assembly of claim 1, wherein the first support bracket assembly and the second support bracket assembly are each configured to form a rounded shoulder extending away along the x-direction from the first end and the second end of the aerodynamic shield, respectively.

3. The aircraft landing gear shield assembly of claim 1, wherein the aerodynamic shield has a length extending between a leading edge and a trailing edge, a height extending between an upper surface and a lower surface, and a ratio of the height to the length of between about 1.0 and about 0.1.

4. The aircraft landing gear shield assembly of claim 3, wherein the ratio of the height to the length is between about 0.5 and about 0.25.

5. The aircraft landing gear shield assembly of claim 3, wherein the ratio of the height to the length is about 0.33.

6. The aircraft landing gear shield assembly of claim 1, wherein the first clamp is configured to fix the first position of the first support bracket assembly in the x-direction using one of an end flange clamp and a U-clamp.

7. The aircraft landing gear shield assembly of claim 1, wherein the first support bracket assembly is configured to fix the first position of the first support bracket assembly in the y-direction using one of a web clamp and a U-clamp.

8. The aircraft landing gear shield assembly of claim 7, wherein the first support bracket assembly is configured to fix the first position of the first support bracket assembly in the y-direction using the web clamp, wherein the web clamp is configured to extend through a web of the structural member.

9. The aircraft landing gear shield assembly of claim 7, wherein the first support bracket assembly is configured to fix the first position of the first support bracket assembly in the y-direction using the web clamp, wherein the web clamp comprises a sub-clamp that is adjustably coupled with an adjustable web pad, the adjustable web pad and the sub-clamp being configured to remain separated by a gap when the adjustable web pad clamps a web of the structural member.

10. The aircraft landing gear shield assembly of claim 7, wherein the first support bracket assembly is configured to fix the first position of the first support bracket assembly in the z-direction using one of an outer flange clamp and a locking mechanism having a locking arm configured to contact an outer flange of the structural member.

11. The aircraft landing gear shield assembly of claim 10, wherein the second support bracket assembly is configured to fix the second position of the second support bracket assembly in the y-direction using a second web clamp.

12. The aircraft landing gear shield assembly of claim 11, wherein the second support bracket assembly is configured to fix the second position of the second support bracket assembly in the z-direction using one of a second outer flange clamp and a second locking mechanism having a second locking arm.

13. An aircraft landing gear shield assembly, comprising: an aerodynamic shield; a first support bracket assembly that is configured to couple with a structural member of an aircraft landing gear and to support a first end of the aerodynamic shield, the first support bracket assembly being configured to have a first position that is fixed relative to the structural member in an x-direction, a y-direction, and a z-direction, wherein the x-direction is substantially parallel to a longitudinal direction of the structural member, wherein the y-direction is normal to the x-direction, wherein the z-direction is normal to the x-direction and normal to the y-direction, the first support bracket assembly having a first clamp that is configured to fix the first support bracket assembly relative to the structural member in the x-direction, wherein the first clamp is an end flange clamp that is adjustably coupled with a first sub-clamp and a second sub-clamp; and a second support bracket assembly that is configured to support a second end of the aerodynamic shield and to have a second position that is fixed relative to the structural member in the y-direction and the z-direction.

14. The aircraft landing gear shield assembly of claim 13, wherein the first clamp is configured to remain separated by a gap from the first sub-clamp when the first clamp is clamped to an end flange of the structural member.

15. An aircraft landing gear acoustic noise reduction system that includes a structural member, comprising: an aerodynamic shield; a first support bracket assembly configured to support a first end of the aerodynamic shield and to couple with a structural member of an aircraft landing gear, the first support bracket assembly having a first clamp that is configured to fix a position of the first support bracket assembly relative to the structural member in an x-direction that is substantially parallel to a longitudinal direction of the structural member; and a second support bracket assembly that is configured to support a second end of the aerodynamic shield, to couple with the structural member, and to remain unconstrained in the x-direction relative to the structural member.

16. The aircraft landing gear acoustic noise reduction system of claim 15, wherein the first support bracket assembly and the second support bracket assembly are each configured to form a shoulder extending away along the x-direction from the first end and the second end of the aerodynamic shield, respectively.

17. The aircraft landing gear shield assembly of claim 13, wherein the first support bracket assembly and the second support bracket assembly are each configured to form a rounded shoulder extending away along the x-direction from the first end and the second end of the aerodynamic shield, respectively.

18. The aircraft landing gear shield assembly of claim 13, wherein the second support bracket assembly is configured to remain unconstrained in the x-direction relative to the structural member.

19. The aircraft landing gear shield assembly of claim 13, wherein the first support bracket assembly is configured to fix the first position of the first support bracket assembly in the y-direction using a web clamp, wherein the web clamp is configured to extend through a web of the structural member.

20. The aircraft landing gear acoustic noise reduction system of claim 15, wherein the first support bracket assembly is configured to fix the position of the first support bracket assembly in the y-direction using a web clamp, wherein the web clamp is configured to extend through a web of the structural member.

* * * * *